(12) United States Patent
Hosseini et al.

(10) Patent No.: US 11,658,790 B2
(45) Date of Patent: May 23, 2023

(54) SIDELINK COMPONENT CARRIER SELECTION FOR FEEDBACK DURING SIDELINK CARRIER AGGREGATION

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 17/124,081

(22) Filed: Dec. 16, 2020

(65) Prior Publication Data

US 2022/0190966 A1 Jun. 16, 2022

(51) Int. Cl.
| | |
|---|---|
| *H04L 5/00* | (2006.01) |
| *H04W 72/02* | (2009.01) |
| *H04W 72/0453* | (2023.01) |
| *H04W 72/20* | (2023.01) |
| *H04W 76/11* | (2018.01) |
| *H04L 1/1812* | (2023.01) |
| *H04W 92/18* | (2009.01) |

(52) U.S. Cl.
CPC ............ *H04L 5/0055* (2013.01); *H04L 5/001* (2013.01); *H04W 72/02* (2013.01); *H04W 72/0453* (2013.01); *H04W 72/20* (2023.01); *H04L 1/1819* (2013.01); *H04W 76/11* (2018.02); *H04W 92/18* (2013.01)

(58) Field of Classification Search
CPC ...... H04L 5/001; H04L 5/0055; H04W 72/02; H04W 72/0406; H04W 72/0453
See application file for complete search history.

(56) References Cited

U.S. PATENT DOCUMENTS

| | | | |
|---|---|---|---|
| 9,961,704 B2 * | 5/2018 | Xu | H04W 72/0453 |
| 2018/0054237 A1 * | 2/2018 | Tseng | H04W 72/085 |
| 2018/0069664 A1 * | 3/2018 | Khoryaev | H04L 1/1854 |
| 2020/0220669 A1 | 7/2020 | Park | |
| 2020/0221467 A1 * | 7/2020 | Huang | H04W 72/042 |
| 2021/0136856 A1 * | 5/2021 | Tseng | H04W 76/14 |
| 2021/0314112 A1 * | 10/2021 | Balasubramanian | H04L 5/001 |

(Continued)

OTHER PUBLICATIONS

International Search Report and Written Opinion—PCT/US2021/072865—ISA/EPO—dated Mar. 3, 2022.

(Continued)

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a first user equipment (UE) may receive a communication from a second UE. The UE may transmit, to the second UE, sidelink hybrid automatic repeat request acknowledgement (HARQ-ACK) feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE. Numerous other aspects are provided.

30 Claims, 14 Drawing Sheets

(56) References Cited

U.S. PATENT DOCUMENTS

| | | | |
|---|---|---|---|
| 2021/0385804 A1* | 12/2021 | Ye | H04W 72/0406 |
| 2022/0150908 A1* | 5/2022 | Ji | H04L 1/1861 |

OTHER PUBLICATIONS

ZTE: "ACK/NACK Design for LTE-Advanced", 3GPP Draft, TSG-RAN WG1 #58bis, R1-094739, An Design for LTE-A, 3rd Generation Partnership Project (3GPP), Mobile Competence Centre, 650, Route Des Lucioles, F-06921 Sophia-Antipolis Cedex, France, No. Jeju, Nov. 9, 2009, Nov. 9, 2009 (Nov. 9, 2009), XP050389136, pp. 1-7, [Retrieved on Nov. 3, 2009], The Whole Document.

* cited by examiner

SIDELINK COMPONENT CARRIER SELECTION FOR FEEDBACK DURING SIDELINK CARRIER AGGREGATION

FIELD OF THE DISCLOSURE

Aspects of the present disclosure generally relate to wireless communication and to techniques and apparatuses for sidelink component carrier selection for feedback during sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving a communication from a second UE; and transmitting, to the second UE, sidelink hybrid automatic repeat request acknowledgement (HARQ-ACK) feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE.

In some aspects, a method of wireless communication performed by a first UE includes transmitting data to a second UE; and receiving, from the second UE, sidelink HARQ-ACK feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE.

In some aspects, a first UE for wireless communication includes a memory and one or more processors operatively coupled to the memory, the memory and the one or more processors configured to: receive a communication from a second UE; and transmit, to the second UE, sidelink HARQ-ACK feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE.

In some aspects, a first UE for wireless communication includes a memory and one or more processors operatively coupled to the memory, the memory and the one or more processors configured to: transmit data to a second UE; and receive, from the second UE, sidelink HARQ-ACK feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE.

In some aspects, a non-transitory computer-readable medium storing a set of instructions for wireless communication includes one or more instructions that, when executed by one or more processors of a first UE, cause the first UE to: receive a communication from a second UE; and transmit, to the second UE, sidelink HARQ-ACK feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE.

In some aspects, a non-transitory computer-readable medium storing a set of instructions for wireless communication includes one or more instructions that, when executed by one or more processors of a first UE, cause the first UE to: transmit data to a second UE; and receive, from the second UE, sidelink HARQ-ACK feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE.

In some aspects, a first apparatus for wireless communication includes means for receiving a communication from a second apparatus; and means for transmitting, to the second apparatus, sidelink HARQ-ACK feedback using a sidelink component carrier based at least in part on the communication received from the second apparatus, wherein the sidelink component carrier is associated with conveying the sidelink HARQ-ACK feedback when sidelink carrier aggregation is configured for a group of apparatuses that includes the first apparatus and the second apparatus.

In some aspects, a first apparatus for wireless communication includes means for transmitting data to a second apparatus; and means for receiving, from the second apparatus, sidelink HARQ-ACK feedback via a sidelink component carrier based at least in part on the data transmitted to the second apparatus, wherein the sidelink component carrier is associated with conveying the sidelink HARQ-ACK feedback when sidelink carrier aggregation is configured for a group of apparatuses that includes the first apparatus and the second apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
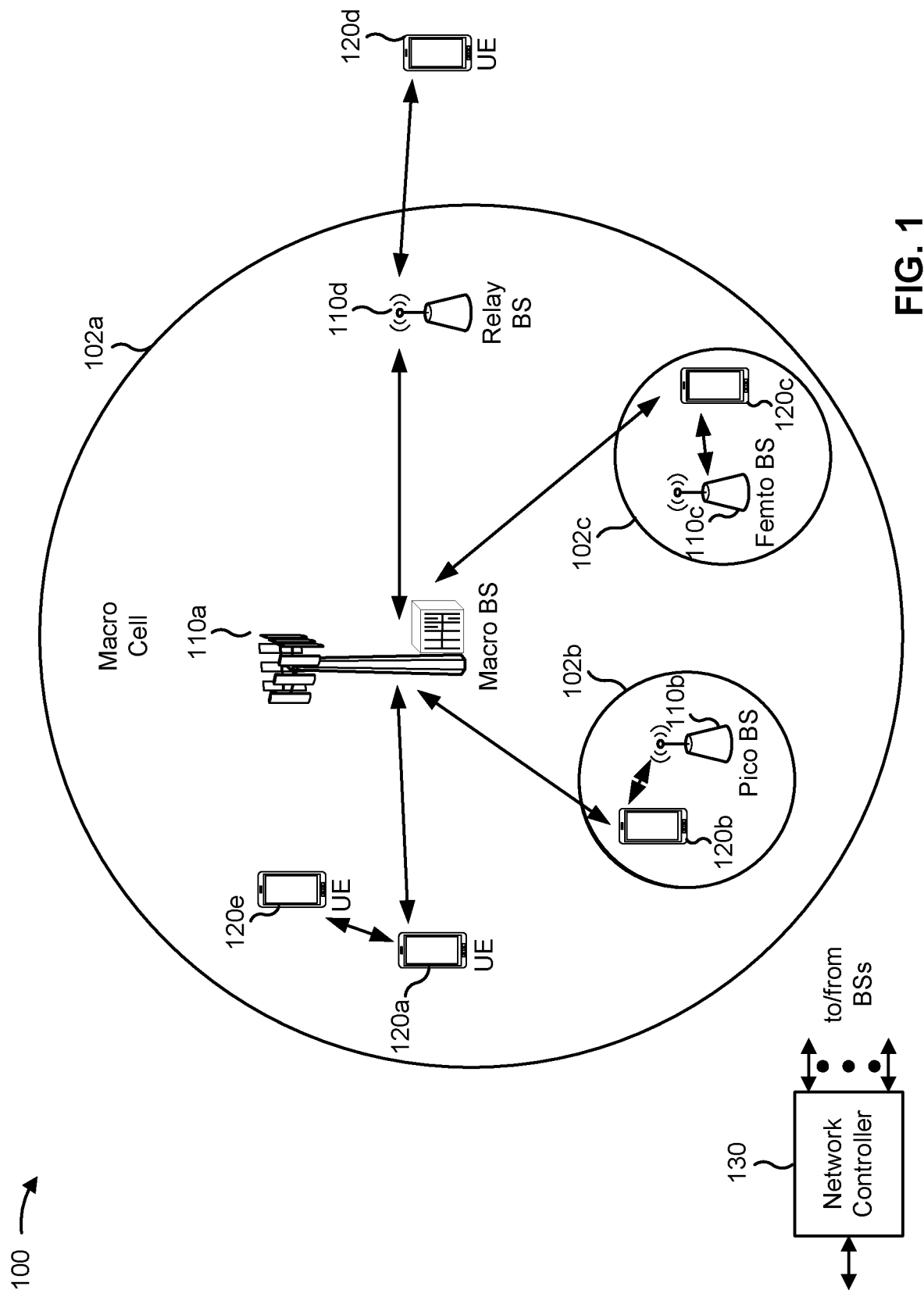
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6

GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
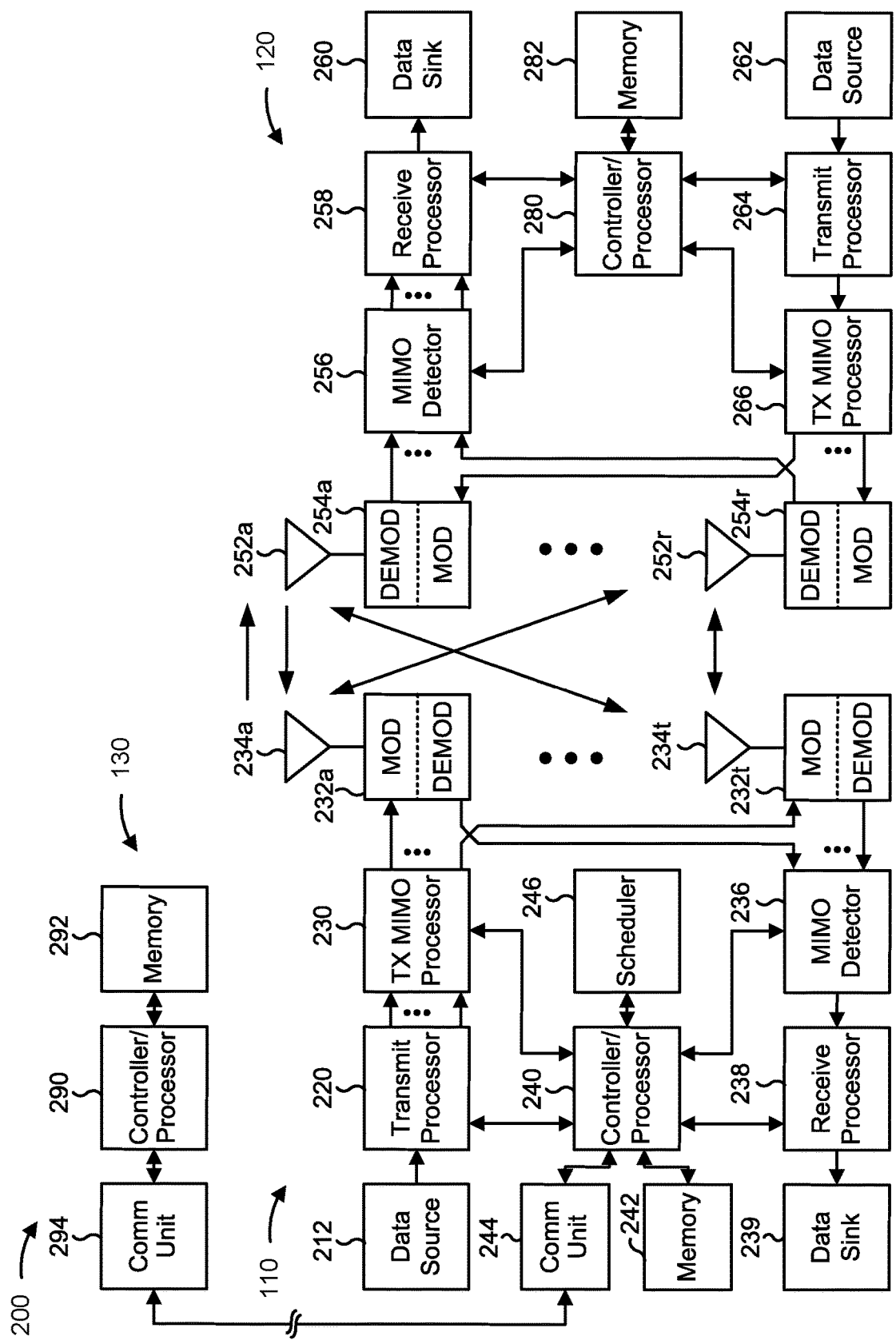
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-13.

Controller/processor 240 of base station 110, controller/processor 280 of UE 120, and/or any other component(s) of FIG. 2 may perform one or more techniques associated with sidelink component carrier selection for feedback during sidelink carrier aggregation, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein.

Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, interpreting the instructions, and/or the like.

In some aspects, a UE (e.g., UE 120) may include means for receiving a communication from a second UE, means for transmitting, to the second UE, sidelink HARQ-ACK feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a UE (e.g., UE 120) may include means for transmitting data to a second UE, means for receiving, from the second UE, sidelink HARQ-ACK feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
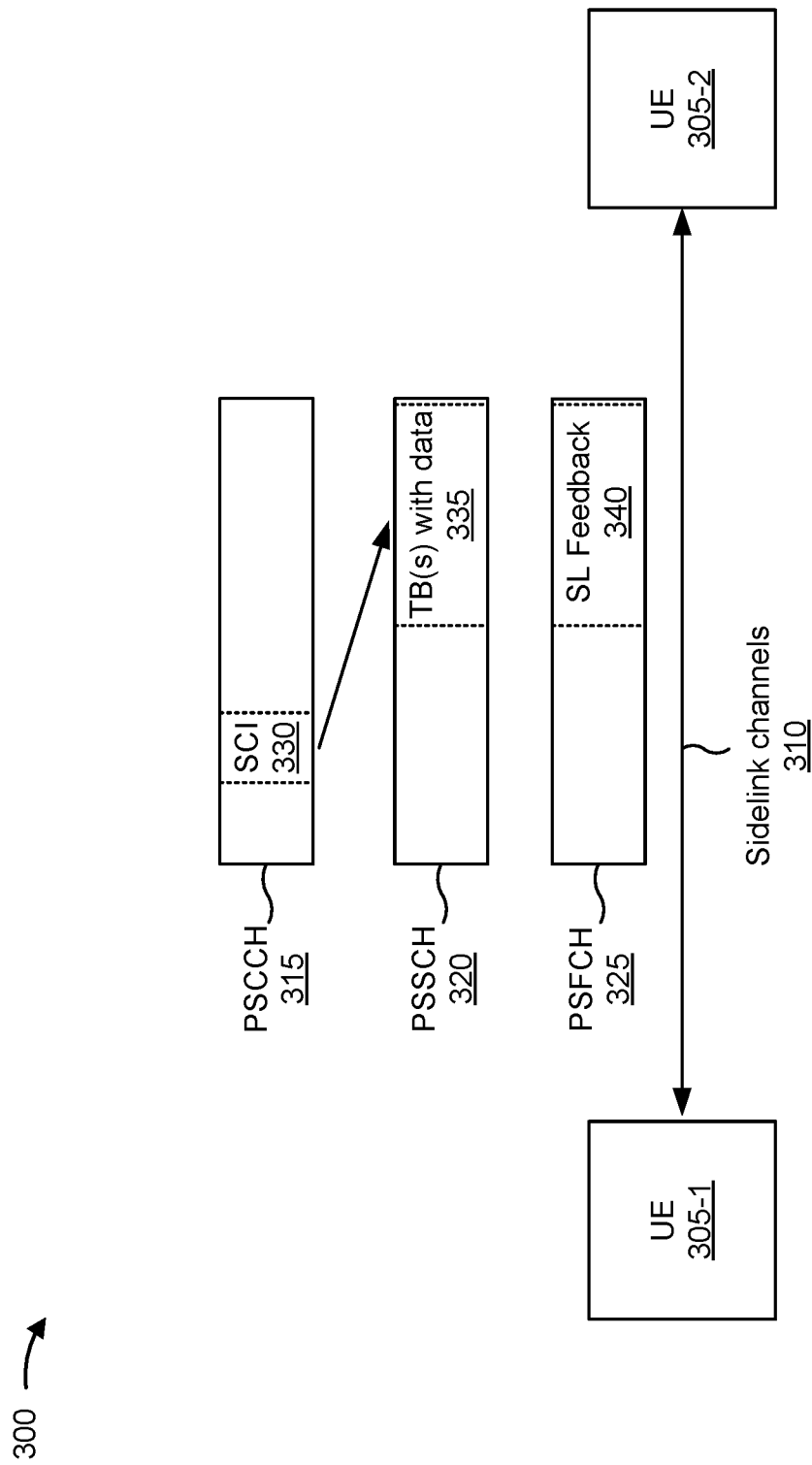
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
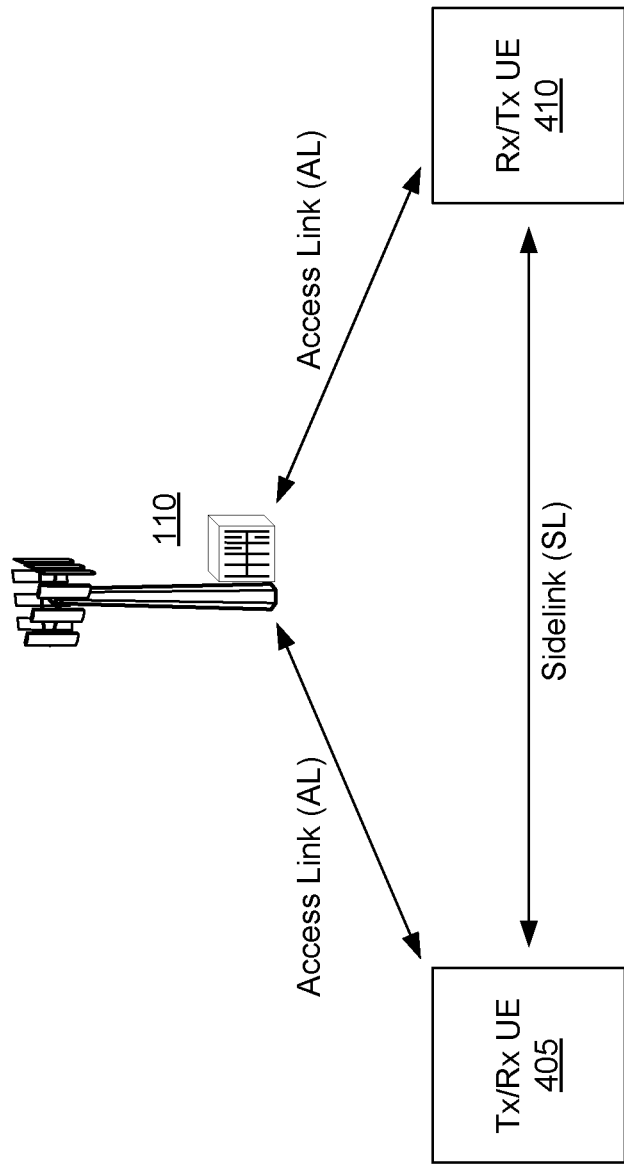
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In an LTE system, sidelink carrier aggregation was adopted for an LTE Mode 4 resource allocation. The LTE Mode 4 resource allocation may correspond to an NR Mode 2 resource allocation, in which autonomous transmissions may be performed via a sidelink channel via a sensing and reservation mechanism. From a physical layer perspective, up to eight sidelink component carriers may be aggregated. Further, particular sidelink component carriers may be indicated by higher layers for a transmission and potential retransmission of data, such as a medium access control (MAC) protocol data unit (PDU).

A configuration for aggregated sidelink component carriers may be provided via the higher layers. A subset of the aggregated sidelink component carriers may be active in a UE at a given time depending on active applications executing on the UE. A mapping between a given sidelink component carrier and a given application may occur at higher layers. For example, UEs interested in a given application may identify a set of sidelink component carriers activated for transmissions and/or receptions, with no handshaking or negotiation involved for the UEs. One application may be mapped to a single sidelink component carrier. In some cases, UEs with carrier aggregation and non-carrier aggregation capabilities may communicate with each other. Non-carrier aggregation UEs may support basic safety messages, which may be mapped to a sidelink component carrier that is shared by both non-carrier aggregation UEs and UEs having a carrier aggregation capability.

In an NR system, sidelink carrier aggregation may be associated with two separate operating modes. In a first operating mode, sidelink carrier aggregation may be set up and controlled by the network. In a second operating mode, sidelink carrier aggregation may be set up by peer UEs, such as other sidelink UEs.

In the NR system, sidelink carrier aggregation may be associated with one of several cast types, such as unicast, groupcast, or broadcast. With respect to unicast, one unicast session or multiple unicast sessions may be supported. For example, one relay UE may support multiple remote UEs in multiple unicast sessions.

Several differences exist between sidelink carrier aggregation in the LTE system versus sidelink carrier aggregation in the NR system. The LTE system may support broadcast but not unicast and groupcast, whereas the NR system may support unicast, groupcast and broadcast. The LTE system may not support sidelink HARQ feedback, whereas the NR system may support sidelink HARQ feedback. The NR system may support the sidelink HARQ feedback for unicast and groupcast. In the LTE system, the sidelink carrier aggregation may not be controlled by a base station, whereas in the NR system, the sidelink carrier aggregation may not controlled by the base station.

One bandwidth part may be configured with multiple transmit and receive sidelink resource pools. Each transmit sidelink resource pool may also be used for receptions. However, a given receive sidelink resource pool may not be used for transmissions. A PSFCH configuration may be per sidelink resource pool.

On a given bandwidth part, a plurality of sidelink resource pools (e.g., all sidelink resource pools) may have a same PSFCH configuration. As a result, when a UE is active on multiple sidelink resource pools, phase discontinuity due to non-aligned transmissions may not occur.

For sidelink carrier aggregation, sidelink component carriers may be preconfigured, and each bandwidth part may be preconfigured with a number of sidelink resource pools. Alternatively, for sidelink carrier aggregation, sidelink component carriers may be configured and sidelink resource pools associated with each bandwidth part may be configured by a third node, such as a base station or a relay node.

Figure 5:
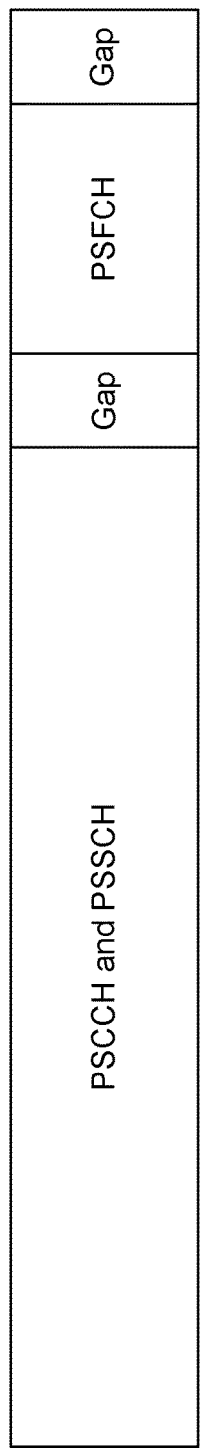
FIG. 5 is a diagram illustrating an example of sidelink channels, in accordance with various aspects of the present disclosure.

FIG. 5 is a diagram illustrating an example 500 of sidelink channels, in accordance with various aspects of the present disclosure.

As shown in FIG. 5, a PSCCH and a PSSCH may be associated with a plurality of resources in a time domain and a frequency domain. A PSFCH may be associated with a plurality of resources in the time domain and the frequency domain. The PSCCH and the PSSCH may not be separated by a gap. The PSCCH and the PSSCH may be separated by a gap with the PSFCH.

As indicated above, FIG. 5 is provided as an example. Other examples may differ from what is described with regard to FIG. 5.

Figure 6:
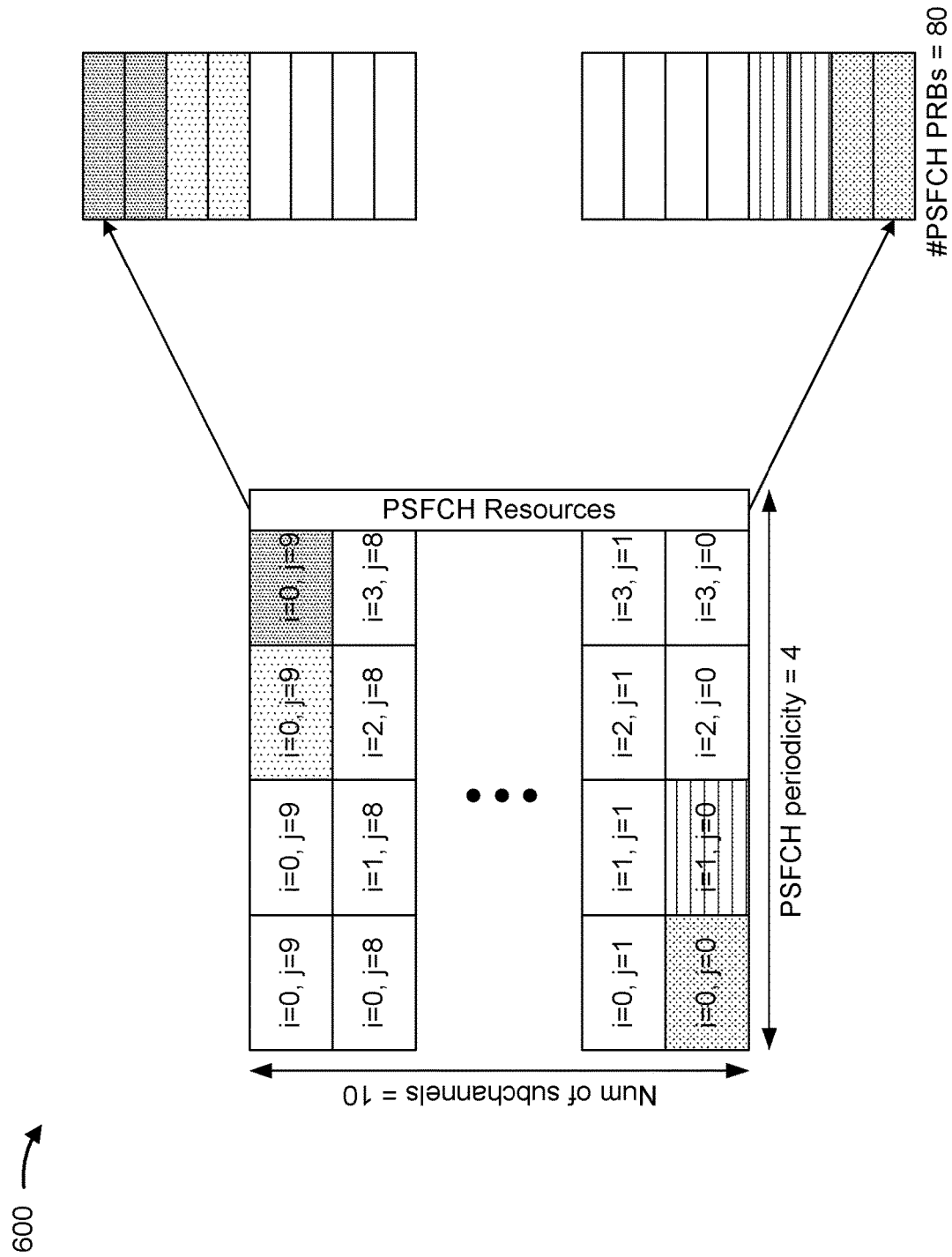
FIG. 6 is a diagram illustrating an example of determining a physical sidelink feedback channel (PSFCH) resource, in accordance with various aspects of the present disclosure.

FIG. 6 is a diagram illustrating an example 600 of determining a PSFCH resource, in accordance with various aspects of the present disclosure.

A period PSFCH resource (periodPSFCHresource) parameter may indicate a PSFCH periodicity, in number of slots, in a sidelink resource pool. The period PSFCH resource parameter may be set to {0,1,2,4}. When the period PSFCH resource parameter is set to 0, PSFCH transmissions from a UE in the sidelink resource pool may be disabled. The UE may transmit the PSFCH in a first slot that includes PSFCH resources and is at least a number of slots, as provided by a minimum time gap of PSFCH (MinTimeGapPSFCH) parameter, of the sidelink resource pool after a last slot of a PSSCH reception. A resource block set PSFCH (rbSetPSFCH) parameter may indicate a set of $M_{PRB,set}^{PSFCH}$ physical resource blocks in the sidelink resource resource pool for PSFCH transmission. A number of subchannels (numSubchannel) parameter may indicate a number of $N_{subch}$ sub-channels for the sidelink resource pool. A number of PSSCH slots associated with a PSFCH slot may be represented by $N_{PSSCH}^{PSFCH}$, and may be determined based at least in part on the periodPSFCHresource parameter. Further, $N_{PRB,set}^{PSFCH} = \alpha \cdot N_{subch} \cdot N_{PSSCH}^{PSFCH}$, where $\alpha$ represents an integer value. Further, $$M_{subch,slot}^{PSFCH} = \frac{M_{PRB,set}^{PSFCH}}{N_{subch} \cdot N_{PSSCH}^{PSFCH}},$$

where $M_{subch,slot}^{PSFCH}$ represents a number of PSFCH PRBs for a sub-channel.

The UE may allocate $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} - 1]$ physical resource blocks from $M_{PRB,set}^{PSFCH}$ physical resource blocks to slot i and sub-channel j, where $0 \leq i \leq N_{PSSCH}^{PSFCH}$ and $0 \leq j \leq N_{subch}$.

In the example shown in FIG. 4, $N_{PSSCH}^{PSFCH}$ may be equal to four, which may correspond to a PSFCH periodicity. Further, $N_{subch}$ may be equal to ten, which may correspond to a number of subchannels for the sidelink resource pool. Further, $M_{subch,slot}^{PSFCH}$ may correspond to $$\frac{80}{4 \times 10},$$

which is equal to two. In other words, each sub-channel may be associated with two PSFCH PRBs, which may correspond to 80 PRBs for the PSFCH. In this example, each sub-channel may be associated with two PSFCH PRBs, but the PSFCH may be sent on one of the PSFCH PRBs.

As indicated above, FIG. 6 is provided as an example. Other examples may differ from what is described with regard to FIG. 6.

For sidelink carrier aggregation, sidelink HARQ ACK feedback may be performed on a per sidelink resource pool and per sidelink component carrier basis. In some cases, performing the sidelink HARQ ACK feedback using a single sidelink component carrier or a subset of sidelink component carriers may be beneficial for several reasons. For example, different UEs establishing a sidelink connection may have different capabilities in terms of a number of supported transmit and receive sidelink component carriers. Further, simultaneous transmission of a PSFCH on different sidelink component carriers may introduce a maximum power reduction (MPR) value or an additional MPR (A-MPR) value, thereby reducing a reliability. Further, the UE may spend an increased amount of power when transmitting multiple PSFCHs, as compared to transmitting a single PSFCH carrying a same number of bits. As a result, a single sidelink component carrier or a subset of component carriers may be selected for conveying sidelink HARQ ACK feedback.

A sidelink HARQ component carrier (e.g., a sidelink primary cell) may be same or different for a first UE may transmit sidelink HARQ to a second UE on a first component carrier (e.g., CC0), and the second UE may transmit sidelink HARQ to the first UE on a second component carrier (e.g., CC1).

As explained above, in an NR system, sidelink HARQ-ACK feedback may be supported, which was not previously supported in an LTE system. However, sidelink UEs may not be configured to transmit sidelink HARQ-ACK feedback for sidelink carrier aggregation. In other words, sidelink UEs may not be configured to transmit sidelink HARQ-ACK feedback using particular sidelink component carriers and/or sidelink resource pools.

In various aspects of techniques and apparatuses described herein, a single sidelink resource pool or sidelink component carrier may be assigned to carry sidelink HARQ-ACK feedback for a group of sidelink resource pools or sidelink component carriers when sidelink carrier aggregation is configured across a pair or group of UEs. In some aspects, within a group of sidelink component carriers with a PSFCH configuration, a single sidelink component carrier or a subset of sidelink component carriers for carrying the sidelink HARQ-ACK feedback may be indicated to a sidelink UE. For example, the sidelink UE may receive the indication from a base station or a relay node. In some aspects, when sidelink carrier aggregation is allowed across sidelink component carriers with a same PSFCH configuration, one sidelink component carrier or subset of sidelink component carriers may be selected to convey the sidelink HARQ-ACK feedback. When the subset of sidelink component carriers are selected, a mapping may be performed between each sidelink component carrier and each of the sidelink HARQ component carriers. For example, a HARQ for a PSSCH on a first component carrier (e.g., CC1) may be mapped to a first sidelink HARQ component carrier, and a HARQ for a PSSCH on a second component carrier (e.g., CC2) may be mapped to a second sidelink HARQ component carrier.

Figure 7:
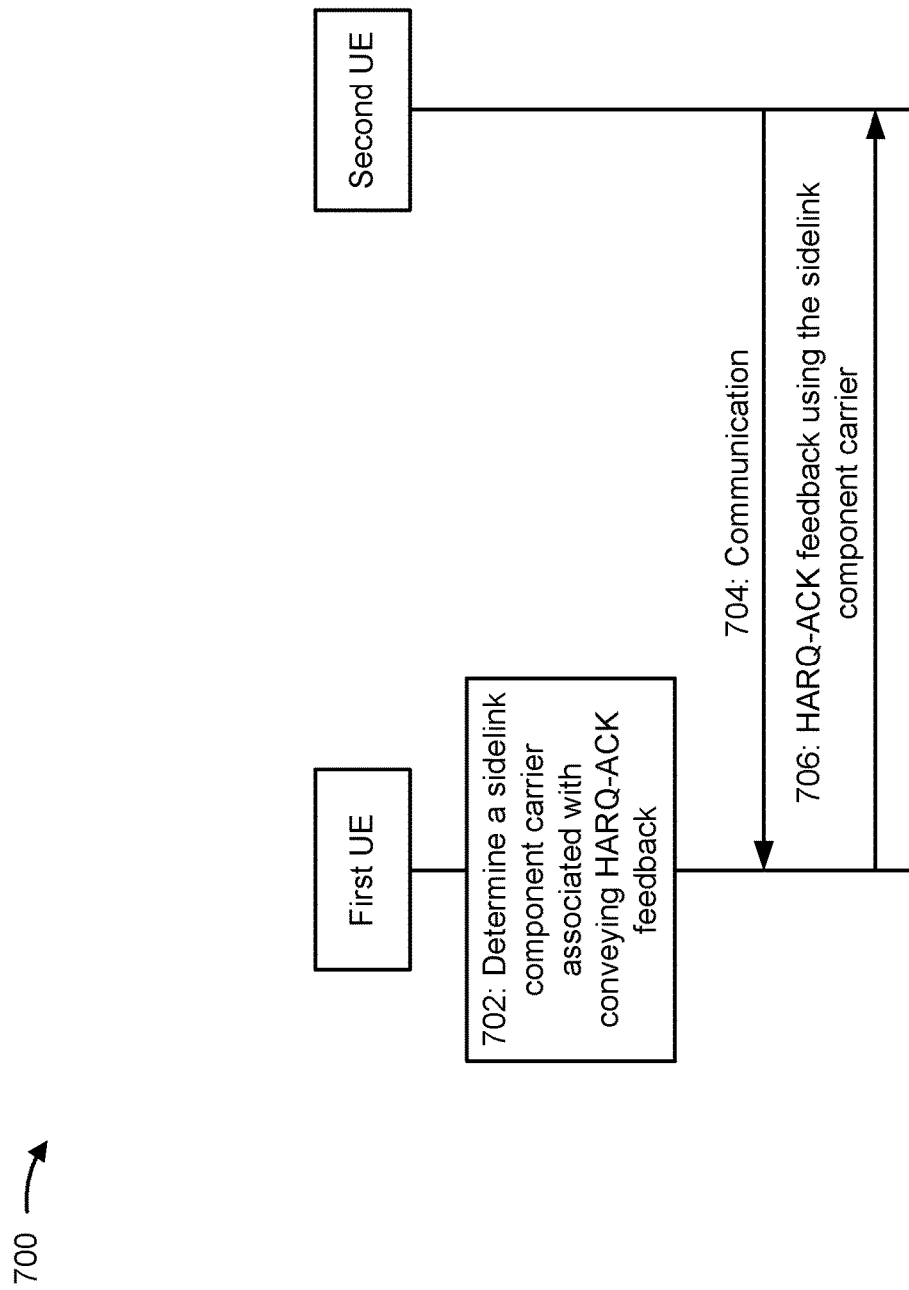
FIGS. 7-11 are diagrams illustrating examples associated with sidelink component carrier selection for feedback during sidelink carrier aggregation, in accordance with various aspects of the present disclosure.

FIG. 7 is a diagram illustrating an example 700 associated with sidelink component carrier selection for feedback during sidelink carrier aggregation, in accordance with various aspects of the present disclosure. As shown in FIG. 7, example 700 includes communication between a first UE (e.g., UE 120a) and a second UE (e.g., UE 120e). In some aspects, the first UE and the second UE may be included in a wireless network such as wireless network 100. The first UE and the second UE may communicate on a wireless sidelink.

As shown by reference number 702, the first UE may determine a sidelink component carrier associated with conveying sidelink HARQ-ACK feedback when sidelink carrier aggregation is configured for a group of UEs, which may include the first UE and the second UE. The first and second UEs may be sidelink UEs. The sidelink component carrier may be associated with a sidelink resource pool used to convey the sidelink HARQ-ACK feedback. The sidelink component carrier associated with conveying the sidelink HARQ-ACK feedback may be determined by both the first UE and the second UE, for example, in a negotiation during a PC5 link setup in case of unicast. The sidelink component carrier associated with conveying the sidelink HARQ-ACK feedback may be determined based at least in part on transmit/receive capabilities of the first UE and the second UE, and/or bands supported by the first UE and the second UE.

In some aspects, a single sidelink resource pool or a single sidelink component carrier may be assigned to carry sidelink HARQ-ACK feedback for a group of sidelink resource pools or sidelink component carriers, when sidelink carrier aggregation is configured across a pair of UEs (e.g., the first UE and the second UE) or a group of UEs.

In some aspects, the group of sidelink component carriers may be preconfigured for the pair or group of UEs. For example, the pair or group of UEs may select the group of sidelink component carriers to communicate with each other. The group of sidelink component carriers may be associated with a same PSFCH configuration, different PSFCH configurations, or no PSFCH configuration. The group of sidelink component carriers may include the single sidelink component carrier assigned to carry the sidelink HARQ-ACK feedback.

In some aspects, the single sidelink component carrier (or a subset of sidelink component carriers) for carrying the sidelink HARQ-ACK feedback may be indicated to the first UE, where the single sidelink component carrier (or subset) may be associated with a PSFCH configuration. The first UE may receive the indication via an explicit signaling from a base station. For example, the indication may be directly received from the base station when the first and/or second UEs are in coverage with the base station. Alternatively, the indication may be received indirectly from the base station, such as via another node such as a relay node. The indication may be received indirectly from the base station when the first and/or second UEs are out of coverage with respect to the base station.

In some aspects, the first UE may determine the sidelink component carrier associated with conveying sidelink HARQ-ACK feedback based at least in part on receiving the indication of the sidelink component carrier. The sidelink component carrier may be associated with a PSFCH configuration. In some aspects, the first UE may receive the indication from a base station when the first UE is in coverage with respect to the base station. In some aspects, the first UE may receive the indication from the base station via a relay node when the first UE is out-of-coverage with respect to the base station.

In some aspects, the first UE may receive the indication of the sidelink component carrier from the second UE via a sidelink connection between the first UE and the second UE. In other words, the sidelink component carrier for conveying the sidelink HARQ-ACK feedback may be selected between the first UE and the second UE that are connected via the sidelink connection. The sidelink component carrier may be determined by the first UE or the second UE, or the sidelink component carrier may be negotiated between the first UE and the second UE.

In some aspects, when multiple sidelink resource pools or sidelink component carriers may be used for carrying the sidelink HARQ-ACK feedback, a mapping between the multiple sidelink resource pools or sidelink component carriers and a specific sidelink resource pool or sidelink component carrier assigned to carry the sidelink HARQ-ACK feedback may be indicated to the UE via the indication that is transmitted to the first UE. In other words, the specific sidelink resource pool or sidelink component carrier associated with the indication may be selected from a group of sidelink component carriers that are configured to potentially carry the sidelink HARQ-ACK feedback. In some aspects, the first UE may receive the indication from the base station when the first UE is in coverage with respect to the base station. In some aspects, the first UE may receive the indication from the base station via the relay node when the first UE is out-of-coverage with respect to the base station.

In some aspects, for each sidelink connection (e.g., the sidelink connection between the first UE and the second UE), a sidelink HARQ-ACK feedback associated with one sidelink component carrier may be associated with a single sidelink HARQ-ACK feedback sidelink component carrier. In other words, the sidelink component carrier used to convey the sidelink HARQ-ACK feedback to the second UE may be specific to the sidelink connection between the first UE and the second UE.

As an example, the first UE may have a unicast link with the second UE, and the first UE may have a separate unicast link with a third UE. For the sidelink connection between the first UE and the second UE, a single sidelink component carrier may be selected to carry the sidelink HARQ-ACK feedback. In this case, a plurality of sidelink component carriers (e.g., all sidelink component carriers) between the first UE and the second UE may have associated sidelink HARQ-ACK feedback transmitted on the single sidelink component carrier. The first UE may have a separate sidelink connection with the third UE on the same plurality of sidelink component carriers. For the separate sidelink connection between the first UE and the third UE, a separate sidelink component carrier may be selected to carry sidelink HARQ-ACK feedback between the first UE and the third UE.

In some aspects, the sidelink component carrier associated with conveying the sidelink HARQ-ACK feedback may not be received from the base station. In this case, the first UE may determine the sidelink component carrier based on whether a single sidelink component carrier is associated with a PSFCH configuration, or a group or multiple sidelink component carriers are associated with a PSFCH configuration.

In some aspects, when a single sidelink component carrier is associated with a PSFCH configuration, the first UE may select the single sidelink component carrier to carry the sidelink HARQ-ACK feedback.

In some aspects, when a group of sidelink component carriers are associated with a PSFCH configuration, the first UE may select one of the sidelink component carriers to carry the sidelink HARQ-ACK feedback. In some aspects, the sidelink component carrier selected by the first UE may correspond to an initial sidelink component carrier used for discovery and link setup (e.g., a PC5 link set up) between the first UE and the second UE. In some aspects, the sidelink component carrier selected by the first UE may correspond to a sidelink component carrier associated with a smallest index in relation to the group of sidelink component carriers. In some aspects, the sidelink component carrier may be selected by the first UE based at least in part on an associated PSFCH configuration, which may indicate a number of resource blocks, a supported sidelink feedback channel format, and a periodicity.

In some aspects, when the group of sidelink component carriers are associated with the PSFCH configuration, the sidelink component carrier may be selected by the first UE or the second UE. For example, a pair of UEs (e.g., the first UE and the second UE) or a group of UEs may identify the single sidelink component carrier (or subset of sidelink component carriers) with the PSFCH configuration to be used for conveying the sidelink HARQ-ACK feedback. The single sidelink component carrier (or subset) may be determined by the first UE or the second UE, or the sidelink component carrier may be negotiated between the first UE and the second UE.

In some aspects, when the group of sidelink component carriers are associated with the PSFCH configuration, the sidelink component carrier may be selected by the first UE using other factors, such as a source identifier (ID), a destination ID, a zone ID, a cast type including unicast, groupcast or broadcast, a channel busy ratio, a transmission priority, and/or or a processing timeline of the first UE or the second UE. The processing timeline may be considered when multiple processing is used for sidelink. In some aspects, the first UE may select the sidelink component carrier based at least in part on one or more bands or band combinations for the sidelink carrier aggregation. In some aspects, the first UE may select the sidelink component carrier based at least in part on whether the sidelink component carrier is a licensed or unlicensed sidelink component carrier, whether the sidelink component carrier is associated with a first frequency range or a second frequency range, whether the sidelink component carrier is shared with a Uu interface communication, and/or the like.

In some aspects, the first UE may select the sidelink component carrier based at least in part on a capability of the first UE and the second UE involved in the sidelink carrier aggregation with respect to a number of sidelink component carriers available for transmit and receive operations.

As an example, the first UE may have established a sidelink connection with the second UE. The first UE may transmit on four sidelink component carriers and receive on four sidelink component carriers. However, the second UE may receive on four sidelink component carriers but transmit on two sidelink component carriers. In this case, a sidelink component carrier may be selected for sidelink HARQ-ACK feedback from the two sidelink component carriers that may be used to perform transmit operations by the second UE.

In some aspects, the sidelink component carrier used to convey the sidelink HARQ-ACK feedback may be common among the group of UEs or not common across the group of UEs. In other words, for communication between the pair of UEs or the group of UEs, the sidelink component carrier used to convey the sidelink HARQ-ACK feedback may be the same across the UEs or may be different between the UEs.

For example, for sidelink carrier aggregation between the first UE and the second UE, a single sidelink component carrier may be determined to convey (e.g., transmit or receive) the sidelink HARQ-ACK feedback for both the first UE and the second UE, or a first sidelink component carrier may be determined to convey the sidelink HARQ-ACK feedback for the first UE, and a second sidelink component carrier may be determined to convey the sidelink HARQ-ACK feedback for the second UE. In other words, the first UE may transmit the sidelink HARQ-ACK feedback using the first sidelink component carrier, and the second UE may transmit the sidelink HARQ-ACK feedback using the second sidelink component carrier.

As shown by reference number 704, the first UE may receive a communication from the second UE. For example, the first UE may receive data from the second UE that is to be ACK-NACKed by the first UE.

As shown by reference number 706, the first UE may transmit, to the second UE, the sidelink HARQ-ACK feedback using the sidelink component carrier. The sidelink HARQ-ACK feedback may be transmitted to the second UE via the PSFCH. The first UE may transmit the sidelink HARQ-ACK feedback on the sidelink component carrier based at least in part on the data received from the second UE (e.g., based at least in part on a successful or unsuccessful reception or decoding of the data). The first UE may transmit the sidelink HARQ-ACK feedback after selecting the sidelink component carrier, or after receiving the indication of the sidelink component carrier (e.g., from the base station, the relay node, or the second UE).

As indicated above, FIG. 7 is provided as an example. Other examples may differ from what is described with regard to FIG. 7.

Figure 8:
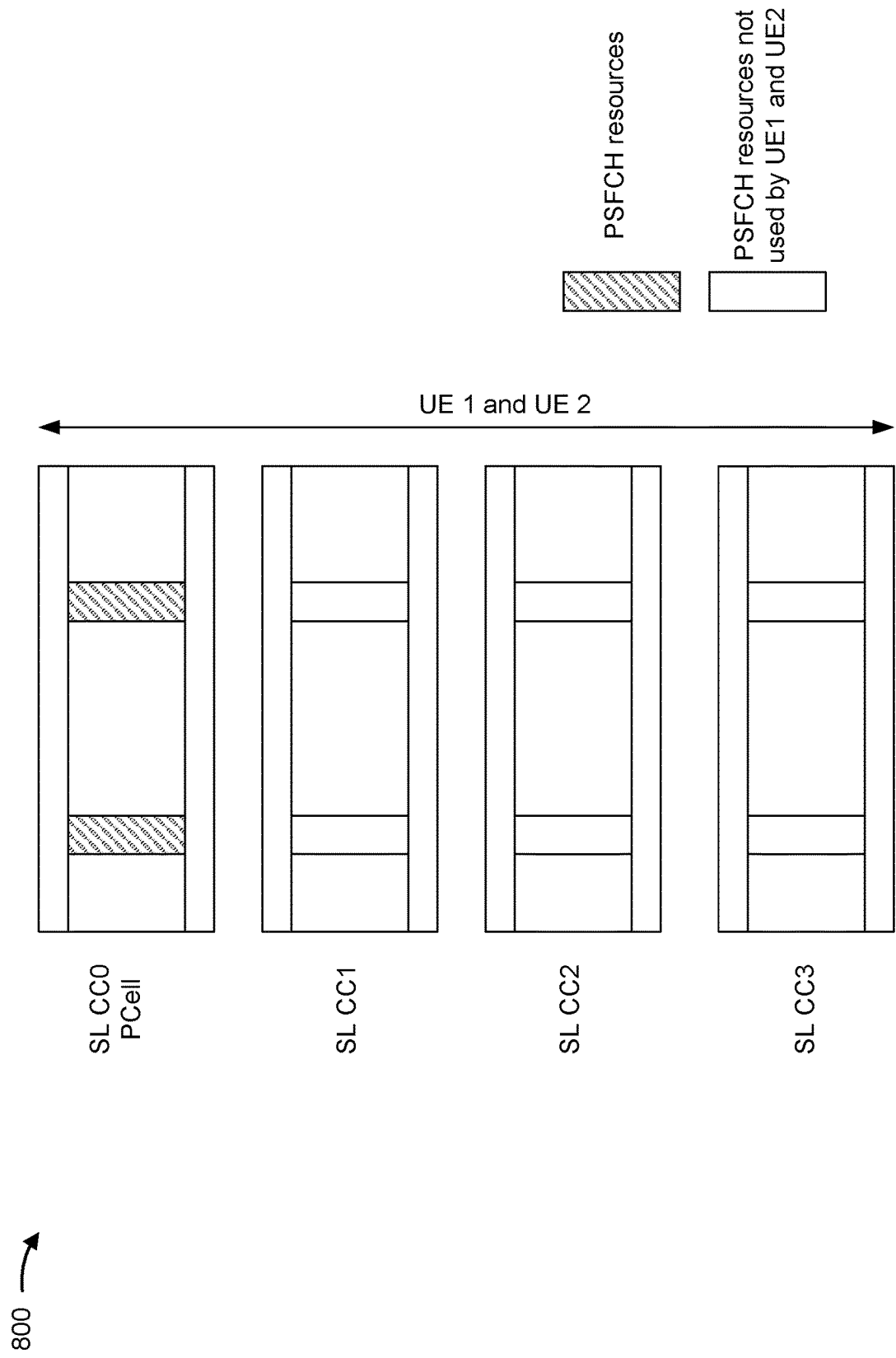

FIG. 8 is a diagram illustrating an example 800 associated with sidelink component carrier selection for feedback during sidelink carrier aggregation, in accordance with various aspects of the present disclosure.

In some aspects, PSFCH transmissions (e.g., sidelink HARQ-ACK feedback transmissions) across multiple sidelink component carriers may be aligned when a single sidelink component carrier or subset of sidelink component carriers are selected for conveying the sidelink HARQ-ACK feedback. In some aspects, a PSFCH configuration may be per sidelink resource pool and/or per carrier. In other words, the PSFCH configuration may be common across a plurality of active UEs on a given sidelink resource pool.

In some aspects, the sidelink component carrier for conveying the sidelink HARQ-ACK feedback may be selected based at least in part on an application and/or service type to be supported. For example, when there are multiple component carriers with PSFCH resources, PSFCH configurations may have different periodicities. An appropriate PSFCH configuration with a given periodicity may be selected based at least in part on the application and/or service type.

In some aspects, when sidelink carrier aggregation is allowed across sidelink component carriers associated with the same PSFCH configuration, one sidelink component carrier or a subset of sidelink component carriers may be selected to convey the sidelink HARQ-ACK feedback. In other words, the one sidelink component carrier or subset may be determined to be a sidelink HARQ component carrier. In this case, UEs may not transmit sidelink HARQ-ACK feedback on other sidelink component carriers. However, PSSCH transmissions and receptions of the UEs in PSFCH slots may remain, as in a non-carrier aggregation scenario.

As shown in FIG. 8, a group of sidelink component carriers may be configured for a first UE and a second UE. The group of sidelink component carriers may include a first sidelink component carrier (SL CC0) associated with a primary cell, a second sidelink component carrier (SL CC1), a third sidelink component carrier (SL CC2), and a fourth sidelink component carrier (SL CC3). In this example, the first sidelink component carrier may include two separate PSFCH resources, and corresponding PSFCH resources associated with the second sidelink component carrier, the third sidelink component carrier, and the fourth sidelink component carrier may not be used by the first UE and the second UE.

As indicated above, FIG. 8 is provided as an example. Other examples may differ from what is described with regard to FIG. 8.

Figure 9:
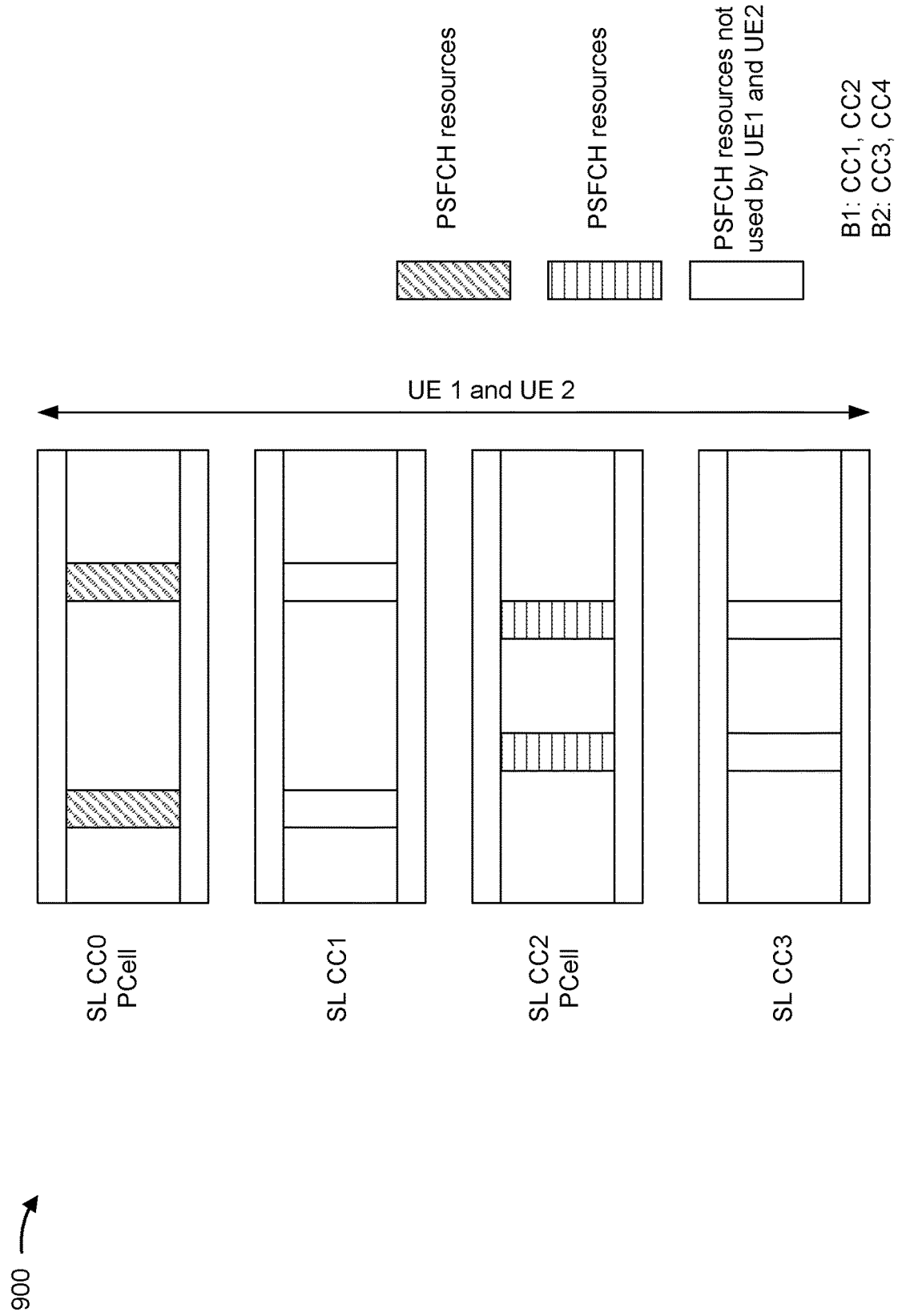

FIG. 9 is a diagram illustrating an example 900 associated with sidelink component carrier selection for feedback during sidelink carrier aggregation, in accordance with various aspects of the present disclosure.

In some aspects, sidelink carrier aggregation may be included in a set of intra-band sidelink component carriers associated with a same PSFCH configuration. In other words, when the intra-band sidelink component carriers have the same PSFCH configuration and are included in the sidelink carrier aggregation, at least one intra-band sidelink component carrier per set of intra-band sidelink component carriers may be identified to carry sidelink HARQ-ACK feedback. In some aspects, rate matching may be limited to each set of intra-band sidelink component carriers.

As shown in FIG. 9, a group of sidelink component carriers may be configured for a first UE and a second UE. The group of sidelink component carriers may be intra-band sidelink component carriers. The group of sidelink component carriers may include a first sidelink component carrier (SL CC0) associated with a first primary cell, and a second sidelink component carrier (SL CC1), where the first sidelink component carrier and the second sidelink component carrier may be associated with a first band. The group of sidelink component carriers may include a third sidelink component carrier (SL CC2) associated with a second primary cell, and a fourth sidelink component carrier (SL CC3), where the third sidelink component carrier and the fourth sidelink component carrier may be associated with a second band. In this example, the first sidelink component carrier may include two separate PSFCH resources, and corresponding PSFCH resources associated with the second sidelink component carrier may not be used by the first UE and the second UE. Further, the third sidelink component carrier may include two separate PSFCH resources, and corresponding PSFCH resources associated with the fourth sidelink component carrier may not be used by the first UE and the second UE.

In some aspects, when a plurality of intra-band sidelink component carriers and inter-band sidelink component carriers are associated with the same PSFCH configuration, a single sidelink component carrier may be selected to carry the sidelink HARQ-ACK feedback. In some aspects, when some sidelink component carriers are intra-band and some sidelink component carriers are inter-band, one sidelink component carrier may be selected as a sidelink HARQ component carrier. However, in this case, transmissions may be shortened to maintain a phase continuity.

As indicated above, FIG. 9 is provided as an example. Other examples may differ from what is described with regard to FIG. 9.

Figure 10:
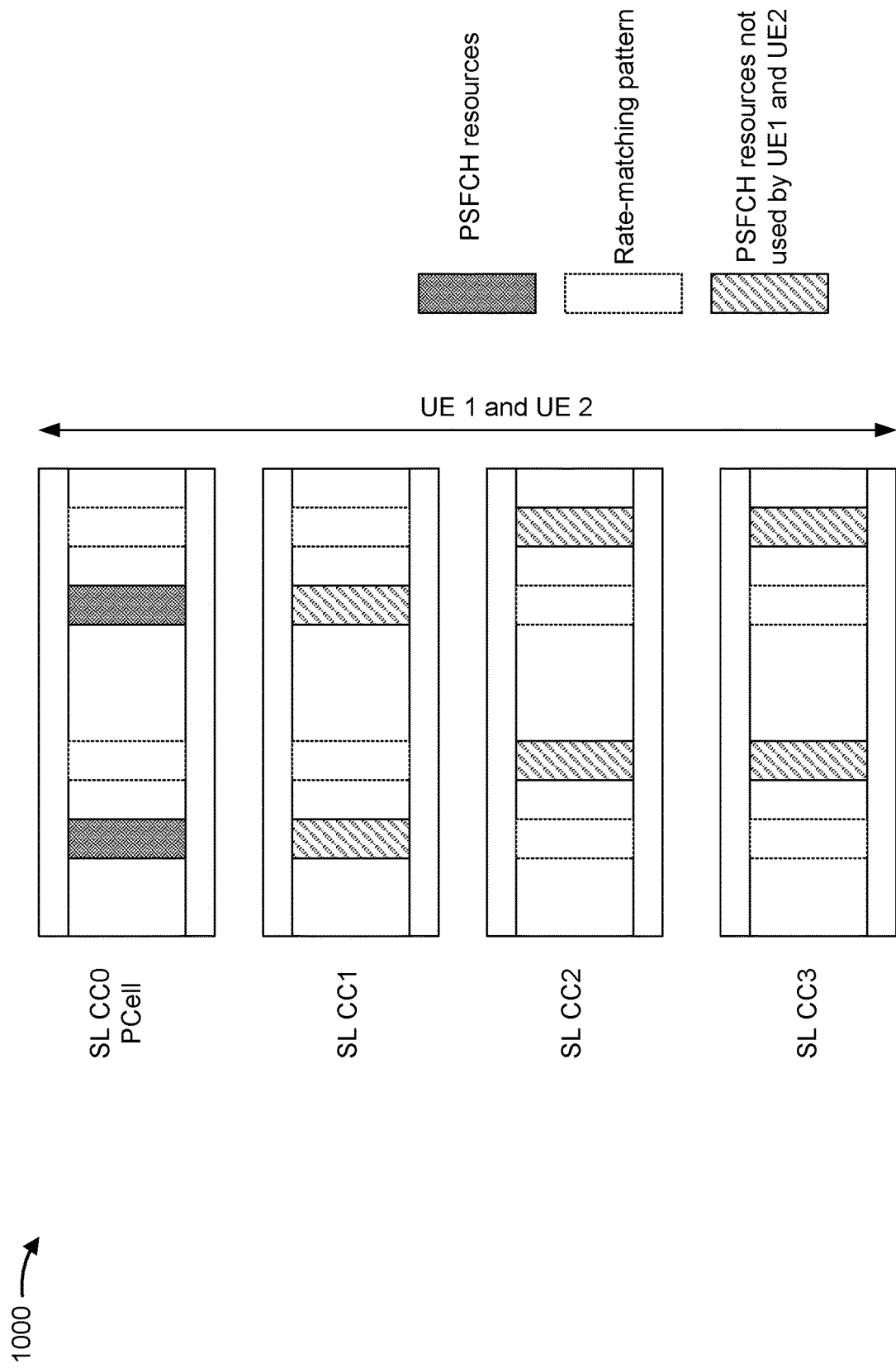

FIG. 10 is a diagram illustrating an example 1000 associated with sidelink component carrier selection for feedback during sidelink carrier aggregation, in accordance with various aspects of the present disclosure.

In some aspects, the sidelink component carrier may be selected based at least in part on a rate matching pattern applied per sidelink component carrier or per sidelink resource pool across a plurality of sidelink component carriers. In other words, when the rate matching pattern is applied on the per sidelink component carrier basis or a per sidelink resource pool basis across the plurality of sidelink component carriers, a single sidelink component carrier or a subset of sidelink component carriers may be selected to carry sidelink HARQ-ACK feedback. In some aspects, a UE may not transmit a PSFCH in other occasions of other sidelink component carriers or sidelink resource pools, and the UE may shorten transmissions from the UE in slots associated with the rate matching pattern.

As shown in FIG. 10, a group of sidelink component carriers may be configured for a first UE and a second UE. The group of sidelink component carriers may include a first sidelink component carrier (SL CC0) associated with a primary cell, a second sidelink component carrier (SL CC1), a third sidelink component carrier (SL CC2), and a fourth sidelink component carrier (SL CC3). In this example, the first sidelink component carrier may include two separate PSFCH resources. The second sidelink component carrier, the third sidelink component carrier, and the fourth sidelink component carrier may be associated with PSFCH resources which are not used by the first UE and the second UE. Further, a rate matching pattern may be applied across the first sidelink component carrier, the second sidelink component carrier, the third sidelink component carrier, and the fourth sidelink component carrier, and the first UE and the second UE may shorten transmissions in slots associated with the rate matching pattern.

As indicated above, FIG. 10 is provided as an example. Other examples may differ from what is described with regard to FIG. 10.

Figure 11:
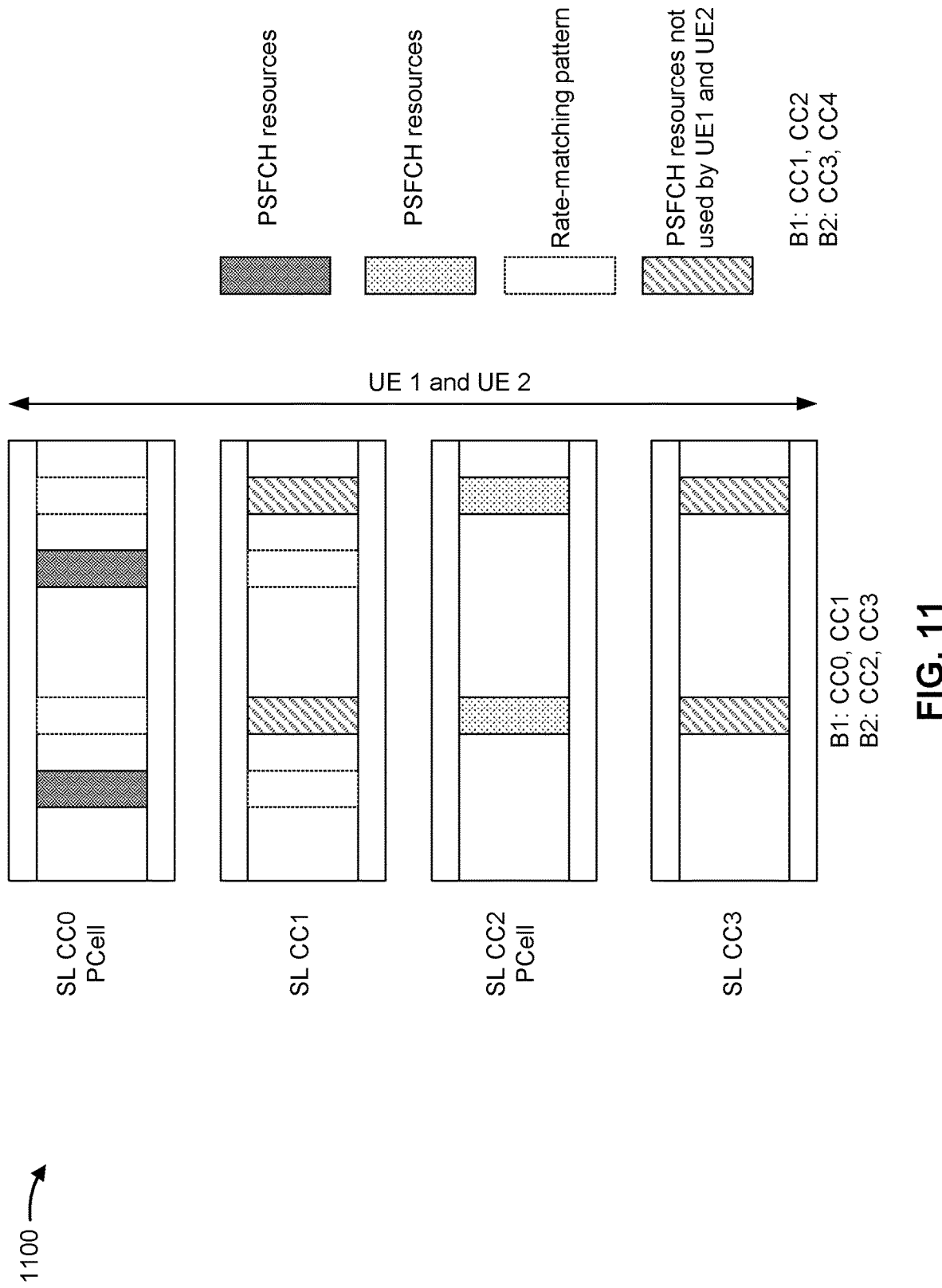

FIG. 11 is a diagram illustrating an example 1100 associated with sidelink component carrier selection for feedback during sidelink carrier aggregation, in accordance with various aspects of the present disclosure.

In some aspects, the sidelink component carrier may be selected based at least in part on a rate matching pattern applied per band across a plurality of intra-band sidelink component carriers. In other words, when the rate matching pattern is applied on the per band basis (e.g., for a plurality of intra-band sidelink component carriers), a single sidelink component carrier or a subset of sidelink component carriers per band may be selected to carry sidelink HARQ-ACK feedback. On a per band basis, a UE may not transmit a PSFCH in other occasions of other sidelink component carriers or sidelink resource pools, and the UE may shorten transmissions from the UE in slots associated with the rate matching pattern.

As shown in FIG. 11, a group of sidelink component carriers may be configured for a first UE and a second UE. The group of sidelink component carriers may be intra-band sidelink component carriers. The group of sidelink component carriers may include a first sidelink component carrier (SL CC0) associated with a first primary cell, and a second sidelink component carrier (SL CC1), where the first sidelink component carrier and the second sidelink component carrier may be associated with a first band. The group of sidelink component carriers may include a third sidelink component carrier (SL CC2) associated with a second primary cell, and a fourth sidelink component carrier (SL CC3), where the third sidelink component carrier and the fourth sidelink component carrier may be associated with a second band. In this example, the first sidelink component carrier may include two separate PSFCH resources. The second sidelink component carrier may be associated with PSFCH resources which are not used by the first UE and the second UE. A rate matching pattern may be applied across the first sidelink component carrier and the second sidelink component carrier, and the first UE and the second UE may shorten transmissions in slots associated with the rate matching pattern. Further, the third sidelink component carrier may include two separate PSFCH resources, and corresponding PSFCH resources associated with the fourth sidelink component carrier may not be used by the first UE and the second UE.

As indicated above, FIG. 11 is provided as an example. Other examples may differ from what is described with regard to FIG. 11.

Figure 12:
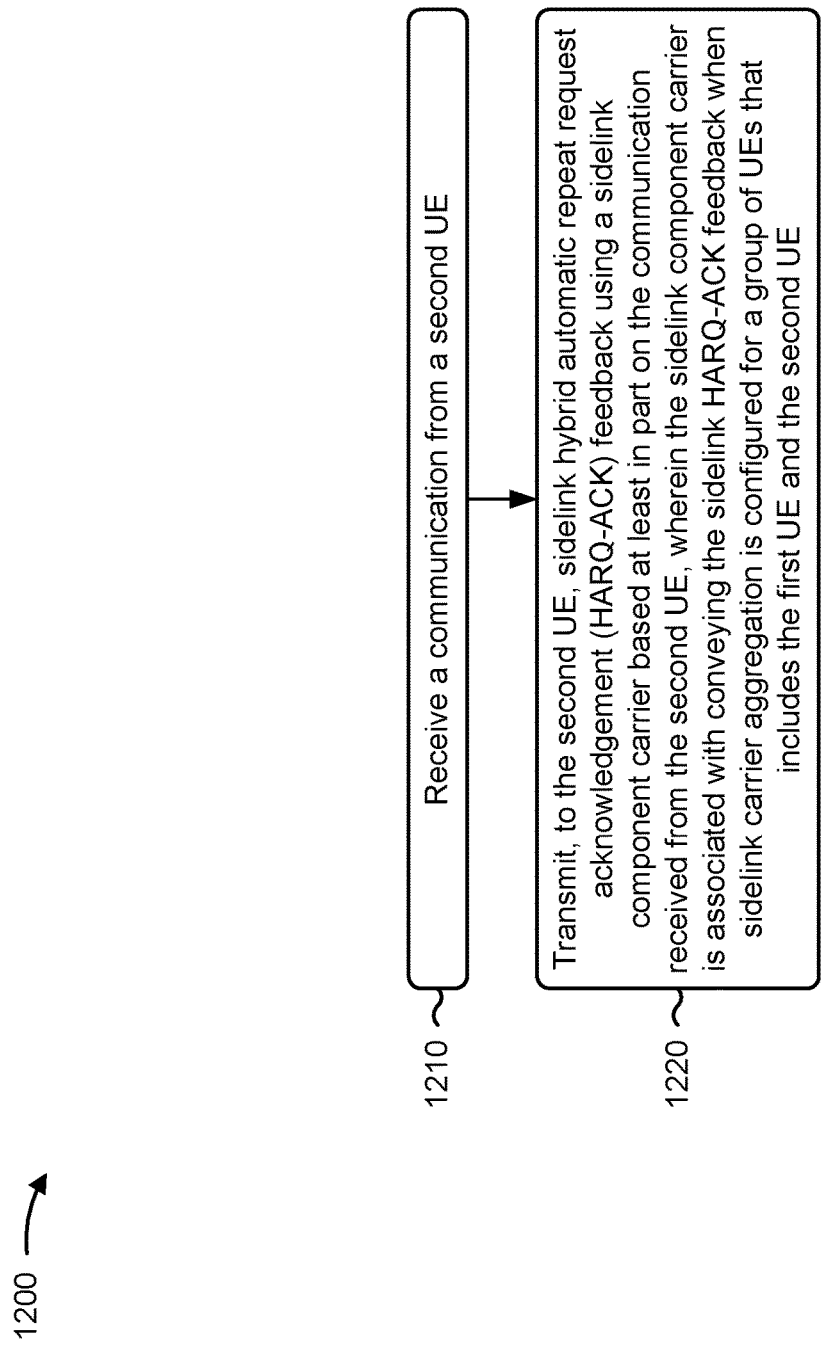
FIGS. 12-13 are diagrams illustrating example processes associated with sidelink component carrier selection for feedback during sidelink carrier aggregation, in accordance with various aspects of the present disclosure.

FIG. 12 is a diagram illustrating an example process 1200 performed, for example, by a first UE, in accordance with various aspects of the present disclosure. Example process 1200 is an example where the first UE (e.g., UE 120) performs operations associated with sidelink component carrier selection for feedback during sidelink carrier aggregation.

As shown in FIG. 12, in some aspects, process 1200 may include receiving a communication from a second UE (block 1210). For example, the first UE (e.g., using antenna 252, demodulator 254, MIMO detector 256, receive processor 258, controller/processor 280, and/or memory 282) may receive a communication from a second UE, as described above.

As further shown in FIG. 12, in some aspects, process 1200 may include transmitting, to the second UE, sidelink HARQ-ACK feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE (block 1220). For example, the first UE (e.g., using antenna 252, transmit processor 264, TX MIMO processor 266, modulator 254, controller/processor 280, and/or memory 282) may transmit, to the second UE, sidelink hybrid automatic repeat request acknowledgement (HARQ-ACK) feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE, as described above.

Process 1200 may include additional aspects, such as any single aspect or any combination of aspects described below and/or in connection with one or more other processes described elsewhere herein.

In a first aspect, the sidelink component carrier is associated with a sidelink resource pool used to convey the sidelink HARQ-ACK feedback.

In a second aspect, alone or in combination with the first aspect, a group of sidelink component carriers that includes the sidelink component carrier are preconfigured for the group of UEs, wherein the group of sidelink component carriers are associated with a same sidelink feedback channel configuration, a different sidelink feedback channel configuration, or no sidelink feedback channel configuration.

In a third aspect, alone or in combination with one or more of the first and second aspects, the sidelink component carrier is included in a subset of sidelink component carriers, wherein the subset is a portion of a plurality of sidelink component carriers.

In a fourth aspect, alone or in combination with one or more of the first through third aspects, process 1200 includes receiving an indication of the sidelink component carrier associated with conveying the sidelink HARQ-ACK feedback, wherein the sidelink component carrier is associated with a sidelink feedback channel configuration.

In a fifth aspect, alone or in combination with one or more of the first through fourth aspects, the indication is received from a base station.

In a sixth aspect, alone or in combination with one or more of the first through fifth aspects, the indication is received from a base station via a relay node.

In a seventh aspect, alone or in combination with one or more of the first through sixth aspects, the indication is received from the second UE via a sidelink connection between the first UE and the second UE.

In an eighth aspect, alone or in combination with one or more of the first through seventh aspects, the sidelink component carrier associated with the indication is selected from a group of sidelink component carriers that are configured to potentially carry the sidelink HARQ-ACK feedback.

In a ninth aspect, alone or in combination with one or more of the first through eighth aspects, the sidelink component carrier used to convey the sidelink HARQ-ACK feedback to the second UE is specific to a sidelink connection between the first UE and the second UE.

In a tenth aspect, alone or in combination with one or more of the first through ninth aspects, the sidelink component carrier used to convey the sidelink HARQ-ACK feedback is associated with a sidelink feedback channel configuration.

In an eleventh aspect, alone or in combination with one or more of the first through tenth aspects, the sidelink component carrier is selected from a group of sidelink component carriers associated with a sidelink feedback channel configuration.

In a twelfth aspect, alone or in combination with one or more of the first through eleventh aspects, the sidelink component carrier corresponds to an initial sidelink component carrier used for discovery and link setup between the first UE and the second UE.

In a thirteenth aspect, alone or in combination with one or more of the first through twelfth aspects, the sidelink component carrier is associated with a smallest index in relation to other sidelink component carriers in a group of sidelink component carriers.

In a fourteenth aspect, alone or in combination with one or more of the first through thirteenth aspects, the sidelink component carrier is selected based at least in part on a sidelink feedback channel configuration associated with a group of sidelink component carriers that includes the sidelink component carrier, wherein the sidelink feedback channel configuration indicates a number of resource blocks, a supported sidelink feedback channel format, and a periodicity.

In a fifteenth aspect, alone or in combination with one or more of the first through fourteenth aspects, the sidelink component carrier is selected by one or more of the first UE or the second UE.

In a sixteenth aspect, alone or in combination with one or more of the first through fifteenth aspects, the sidelink component carrier is selected based at least in part on a source ID, a destination ID, a zone ID, a cast type including unicast, groupcast or broadcast, a channel busy ratio, a transmission priority, a processing timeline of the first UE or the second UE, an application, or a service type.

In a seventeenth aspect, alone or in combination with one or more of the first through sixteenth aspects, the sidelink component carrier is selected based at least in part on one or more bands or band combinations for the sidelink carrier aggregation.

In an eighteenth aspect, alone or in combination with one or more of the first through seventeenth aspects, the sidelink component carrier is selected based at least in part on whether the sidelink component carrier is a licensed carrier or an unlicensed carrier.

In a nineteenth aspect, alone or in combination with one or more of the first through eighteenth aspects, the sidelink component carrier is selected based at least in part on whether the sidelink component carrier is associated with a first frequency range or a second frequency range.

In a twentieth aspect, alone or in combination with one or more of the first through nineteenth aspects, the sidelink component carrier is selected based at least in part on whether the sidelink component carrier is shared with a Uu interface communication.

In a twenty-first aspect, alone or in combination with one or more of the first through twentieth aspects, the sidelink component carrier is selected based at least in part on a capability of the first UE and the second UE with respect to a number of sidelink component carriers available for transmissions and receptions.

In a twenty-second aspect, alone or in combination with one or more of the first through twenty-first aspects, the sidelink component carrier used to convey the sidelink HARQ-ACK feedback is common among the group of UEs.

In a twenty-third aspect, alone or in combination with one or more of the first through twenty-second aspects, the sidelink component carrier used to convey the sidelink HARQ-ACK feedback is different among the group of UEs.

In a twenty-fourth aspect, alone or in combination with one or more of the first through twenty-third aspects, the sidelink carrier aggregation is allowed across sidelink component carriers associated with a same sidelink feedback channel configuration.

In a twenty-fifth aspect, alone or in combination with one or more of the first through twenty-fourth aspects, the sidelink carrier aggregation is included in a set of intra-band sidelink component carriers associated with a same sidelink feedback channel configuration.

In a twenty-sixth aspect, alone or in combination with one or more of the first through twenty-fifth aspects, the sidelink component carrier is selected based at least in part on a rate matching pattern applied for each sidelink component carrier or for each sidelink resource pool across a plurality of sidelink component carriers, or the sidelink component carrier is selected based at least in part on a rate matching pattern applied per band across a plurality of intra-band sidelink component carriers.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
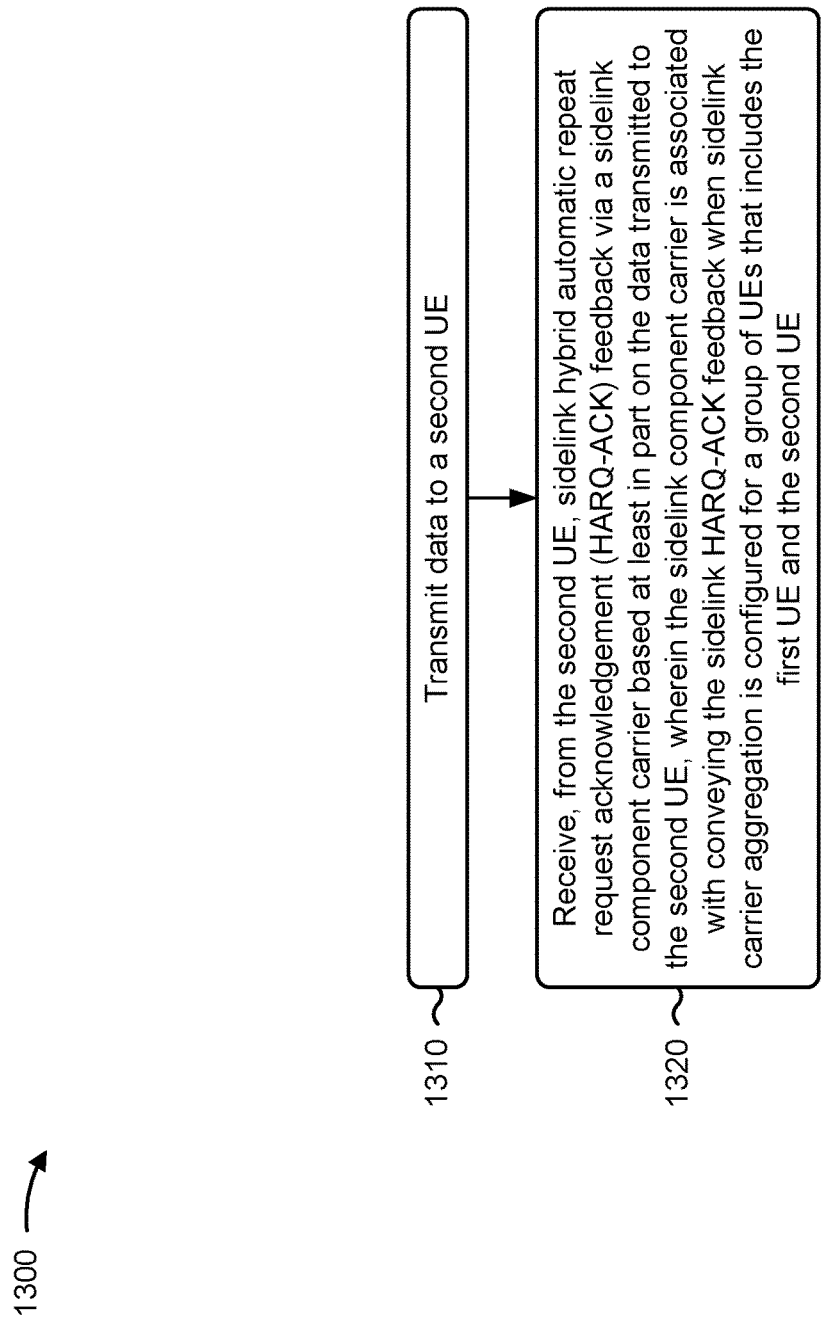

FIG. 13 is a diagram illustrating an example process 1300 performed, for example, by a first UE, in accordance with various aspects of the present disclosure. Example process 1300 is an example where the first UE (e.g., UE 120) performs operations associated with sidelink component carrier selection for feedback during sidelink carrier aggregation. It should be noted that the first UE and the second UE are reversed, in example process 1300, relative to example process 1200.

As shown in FIG. 13, in some aspects, process 1300 may include transmitting data to a second UE (block 1310). For example, the UE (e.g., using antenna 252, transmit processor 264, TX MIMO processor 266, modulator 254, controller/processor 280, and/or memory 282) may transmit data to a second UE, as described above.

As further shown in FIG. 13, in some aspects, process 1300 may include receiving, from the second UE, sidelink HARQ-ACK feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE (block 1320). For example, the first UE (e.g., using antenna 252, demodulator 254, MIMO detector 256, receive processor 258, controller/processor 280, and/or memory 282) may receive, from the second UE, sidelink hybrid automatic repeat request acknowledgement (HARQ-ACK) feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE, as described above.

Process 1300 may include additional aspects, such as any single aspect or any combination of aspects described below and/or in connection with one or more other processes described elsewhere herein.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
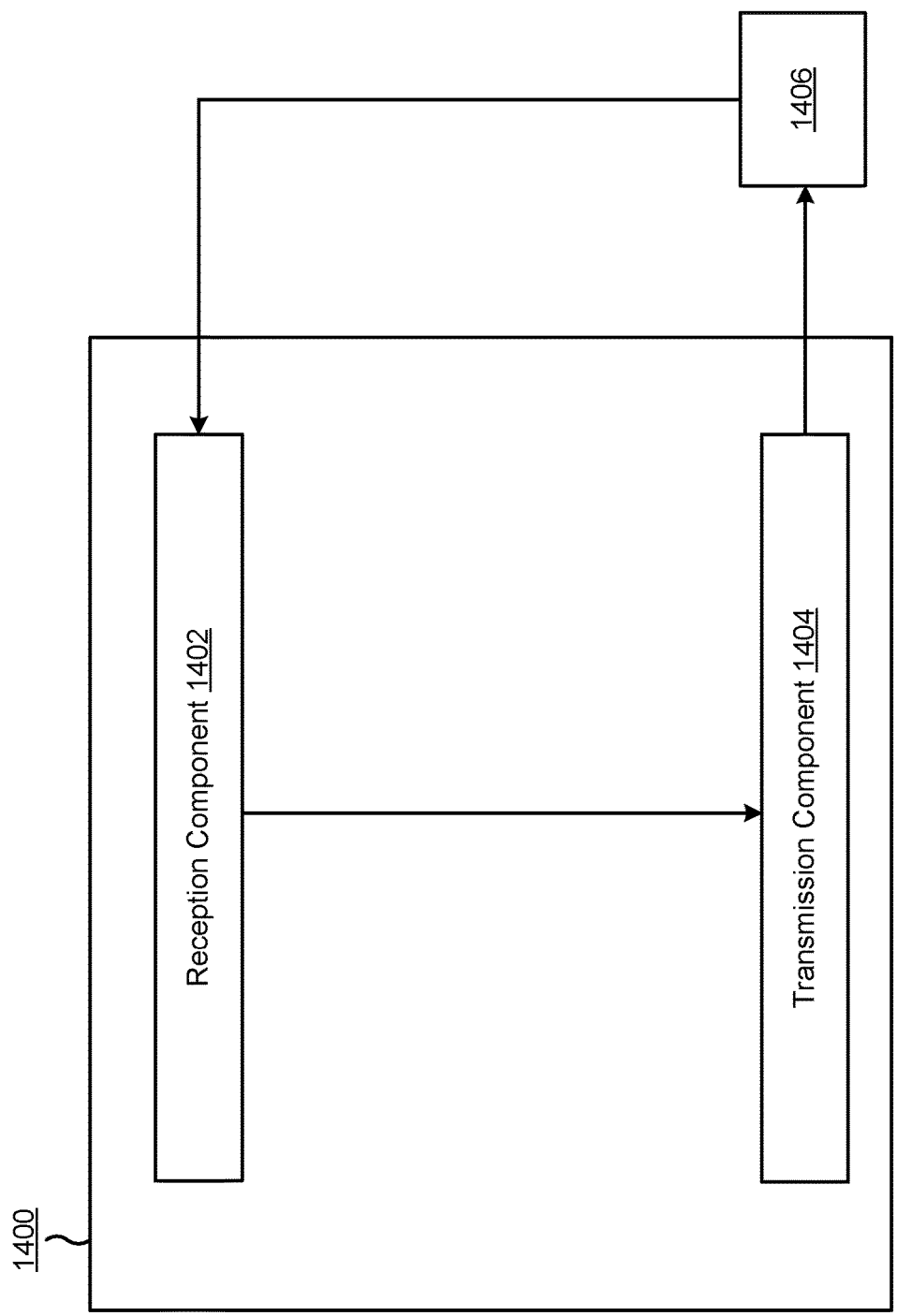
FIG. 14 is a block diagram of an example apparatus for wireless communication, in accordance with various aspects of the present disclosure.

FIG. 14 is a block diagram of an example apparatus 1400 for wireless communication. The apparatus 1400 may be a first UE, or a first UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 7-11. Additionally or alternatively, the apparatus 1400 may be configured to perform one or more processes described herein, such as process 1200 of FIG. 12, and/or process 1300 of FIG. 13. In some aspects, the apparatus 1400 and/or one or more components shown in FIG. 14 may include one or more components of the first UE described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the first UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the first UE described above in connection with FIG. 2. In some aspects, the transmission component 1404 may be co-located with the reception component 1402 in a transceiver.

The reception component 1402 may receive a communication from a second UE. The transmission component 1404 may transmit, to the second UE, sidelink HARQ-ACK feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE The transmission component 1404 may transmit data to a second UE. The reception component 1402 may receive, from the second UE, sidelink HARQ-ACK feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE The reception component 1402 may receive an indication of the sidelink component carrier associated with conveying the sidelink HARQ-ACK feedback, wherein the sidelink component carrier is associated with a sidelink feedback channel configuration.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of aspects of the present disclosure:

Aspect 1: A method of wireless communication performed by a first user equipment (UE), comprising: receiving a communication from a second UE; and transmitting, to the second UE, sidelink hybrid automatic repeat request acknowledgement (HARQ-ACK) feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE.

Aspect 2: The method of aspect 1, wherein the sidelink component carrier is associated with a sidelink resource pool used to convey the sidelink HARQ-ACK feedback.

Aspect 3: The method of any of aspects 1 through 2, wherein a group of sidelink component carriers that includes the sidelink component carrier are preconfigured for the group of UEs, wherein the group of sidelink component carriers are associated with a same sidelink feedback channel configuration, a different sidelink feedback channel configuration, or no sidelink feedback channel configuration.

Aspect 4: The method of any of aspects 1 through 3, wherein the sidelink component carrier is included in a subset of sidelink component carriers, wherein the subset is a portion of a plurality of sidelink component carriers.

Aspect 5: The method of any of aspects 1 through 4, further comprising: receiving an indication of the sidelink component carrier associated with conveying the sidelink HARQ-ACK feedback, wherein the sidelink component carrier is associated with a sidelink feedback channel configuration.

Aspect 6: The method of aspect 5, wherein the indication is received from a base station.

Aspect 7: The method of any of aspects 5 through 6, wherein the indication is received from a base station via a relay node.

Aspect 8: The method of any of aspects 5 through 7, wherein the indication is received from the second UE via a sidelink connection between the first UE and the second UE.

Aspect 9: The method of any of aspects 5 through 8, wherein the sidelink component carrier associated with the indication is selected from a group of sidelink component carriers that are configured to potentially carry the sidelink HARQ-ACK feedback.

Aspect 10: The method of any of aspects 1 through 9, wherein the sidelink component carrier used to convey the sidelink HARQ-ACK feedback to the second UE is specific to a sidelink connection between the first UE and the second UE.

Aspect 11: The method of any of aspects 1 through 10, wherein the sidelink component carrier used to convey the sidelink HARQ-ACK feedback is associated with a sidelink feedback channel configuration.

Aspect 12: The method of any of aspects 1 through 11, wherein the sidelink component carrier is selected from a group of sidelink component carriers associated with a sidelink feedback channel configuration.

Aspect 13: The method of any of aspects 1 through 12, wherein the sidelink component carrier corresponds to an initial sidelink component carrier used for discovery and link setup between the first UE and the second UE.

Aspect 14: The method of any of aspects 1 through 13, wherein the sidelink component carrier is associated with a smallest index in relation to other sidelink component carriers in a group of sidelink component carriers.

Aspect 15: The method of any of aspects 1 through 14, wherein the sidelink component carrier is selected based at least in part on a sidelink feedback channel configuration associated with a group of sidelink component carriers that includes the sidelink component carrier, wherein the sidelink feedback channel configuration indicates a number of resource blocks, a supported sidelink feedback channel format, and a periodicity.

Aspect 16: The method of any of aspects 1 through 15, wherein the sidelink component carrier is selected by one or more of the first UE or the second UE.

Aspect 17: The method of any of aspects 1 through 16, wherein the sidelink component carrier is selected based at least in part on a source identifier (ID), a destination ID, a zone ID, a cast type including unicast, groupcast or broadcast, a channel busy ratio, a transmission priority, a processing timeline of the first UE or the second UE, an application, or a service type.

Aspect 18: The method of any of aspects 1 through 17, wherein the sidelink component carrier is selected based at least in part on one or more bands or band combinations for the sidelink carrier aggregation.

Aspect 19: The method of any of aspects 1 through 18, wherein the sidelink component carrier is selected based at least in part on whether the sidelink component carrier is a licensed carrier or an unlicensed carrier.

Aspect 20: The method of any of aspects 1 through 19, wherein the sidelink component carrier is selected based at least in part on whether the sidelink component carrier is associated with a first frequency range or a second frequency range.

Aspect 21: The method of any of aspects 1 through 20, wherein the sidelink component carrier is selected based at least in part on whether the sidelink component carrier is shared with a Uu interface communication.

Aspect 22: The method of any of aspects 1 through 21, wherein the sidelink component carrier is selected based at least in part on a capability of the first UE and the second UE with respect to a number of sidelink component carriers available for transmissions and receptions.

Aspect 23: The method of any of aspects 1 through 22, wherein the sidelink component carrier used to convey the sidelink HARQ-ACK feedback is common among the group of UEs.

Aspect 24: The method of any of aspects 1 through 23, wherein the sidelink component carrier used to convey the sidelink HARQ-ACK feedback is different among the group of UEs.

Aspect 25: The method of any of aspects 1 through 24, wherein the sidelink carrier aggregation is allowed across sidelink component carriers associated with a same sidelink feedback channel configuration.

Aspect 26: The method of any of aspects 1 through 25, wherein the sidelink carrier aggregation is included in a set of intra-band sidelink component carriers associated with a same sidelink feedback channel configuration.

Aspect 27: The method of any of aspects 1 through 26, wherein: the sidelink component carrier is selected based at least in part on a rate matching pattern applied for each sidelink component carrier or for each sidelink resource pool across a plurality of sidelink component carriers; or the sidelink component carrier is selected based at least in part on a rate matching pattern applied per band across a plurality of intra-band sidelink component carriers.

Aspect 28: A method of wireless communication performed by a first user equipment (UE), comprising: transmitting data to a second UE; and receiving, from the second UE, sidelink hybrid automatic repeat request acknowledgement (HARQ-ACK) feedback via a sidelink component carrier based at least in part on the data transmitted to the second UE, wherein the sidelink component carrier is associated with conveying the sidelink HARQ-ACK feedback when sidelink carrier aggregation is configured for a group of UEs that includes the first UE and the second UE.

Aspect 29: An apparatus for wireless communication at a device, comprising a processor; memory coupled with the processor; and instructions stored in the memory and executable by the processor to cause the apparatus to perform the method of one or more aspects of aspects 1-27.

Aspect 30: A device for wireless communication, comprising a memory and one or more processors coupled to the memory, the memory and the one or more processors configured to perform the method of one or more aspects of aspects 1-27.

Aspect 31: An apparatus for wireless communication, comprising at least one means for performing the method of one or more aspects of aspects 1-27.

Aspect 32: A non-transitory computer-readable medium storing code for wireless communication, the code comprising instructions executable by a processor to perform the method of one or more aspects of aspects 1-27.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-27.

Aspect 34: An apparatus for wireless communication at a device, comprising a processor; memory coupled with the processor; and instructions stored in the memory and executable by the processor to cause the apparatus to perform the method of aspect 28.

Aspect 35: A device for wireless communication, comprising a memory and one or more processors coupled to the memory, the memory and the one or more processors configured to perform the method of aspect 28.

Aspect 36: An apparatus for wireless communication, comprising at least one means for performing the method of aspect 28.

Aspect 37: A non-transitory computer-readable medium storing code for wireless communication, the code comprising instructions executable by a processor to perform the method of aspect 28.

Aspect 38: A non-transitory computer-readable medium storing a set of instructions for wireless communication, the set of instructions comprising one or more instructions that, when executed by one or more processors of a device, cause the device to perform the method of aspect 28.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving a communication from a second UE; and
   transmitting, to the second UE, sidelink hybrid automatic repeat request acknowledgement (HARQ-ACK) feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE, wherein the sidelink component carrier is selected based at least in part on a rate matching pattern applied (i) for each sidelink component carrier or for each sidelink resource pool across a plurality of sidelink component carriers, or (ii) per band across a plurality of intra-band sidelink component carriers.

2. The method of claim 1, wherein a group of sidelink component carriers that includes the sidelink component carrier are preconfigured for the group of UEs, wherein the group of sidelink component carriers are associated with a same sidelink feedback channel configuration, a different sidelink feedback channel configuration, or no sidelink feedback channel configuration.

3. The method of claim 1, wherein the sidelink component carrier is included in a subset of sidelink component carriers, wherein the subset is a portion of a plurality of sidelink component carriers.

4. The method of claim 1, further comprising:
   receiving an indication of the sidelink component carrier associated with conveying the sidelink HARQ-ACK feedback, wherein the sidelink component carrier is associated with a sidelink feedback channel configuration, wherein:
   the indication is received from a base station via a relay node; or
   the indication is received from the second UE via a sidelink connection between the first UE and the second UE; or
   the sidelink component carrier associated with the indication is selected from a group of sidelink component carriers that are configured to potentially carry the sidelink HARQ-ACK feedback.

5. The method of claim 1, wherein the sidelink component carrier used to convey the sidelink HARQ-ACK feedback is specific to a sidelink connection between the first UE and the second UE, or the sidelink component carrier used to convey the sidelink HARQ-ACK feedback is associated with a sidelink feedback channel configuration, or the sidelink component carrier used to convey the sidelink HARQ-ACK feedback is common among the group of UEs, or the sidelink component carrier used to convey the sidelink HARQ-ACK feedback is different among the group of UEs.

6. The method of claim 1, wherein the sidelink component carrier corresponds to an initial sidelink component carrier used for discovery and link setup between the first UE and the second UE.

7. The method of claim 1, wherein the sidelink component carrier is associated with a smallest index in relation to other sidelink component carriers in a group of sidelink component carriers.

8. The method of claim 1, wherein the sidelink carrier aggregation is allowed across sidelink component carriers associated with a same sidelink feedback channel configuration, or the sidelink carrier aggregation is included in a set of intra-band sidelink component carriers associated with a same sidelink feedback channel configuration.

9. A method of wireless communication performed by a first user equipment (UE), comprising:
   transmitting data to a second UE; and
   receiving, from the second UE, sidelink hybrid automatic repeat request acknowledgement (HARQ-ACK) feedback via a sidelink component carrier after transmitting the data to the second UE, wherein the sidelink component carrier is associated with conveying the sidelink HARQ-ACK feedback when sidelink carrier aggregation is configured for a group of UEs that includes the first UE and the second UE, wherein the sidelink component carrier is selected based at least in part on a rate matching pattern applied (i) for each sidelink component carrier or for each sidelink resource pool across a plurality of sidelink component carriers, or (ii) per band across a plurality of intra-band sidelink component carriers.

10. A first user equipment (UE) for wireless communication, comprising:

a memory; and
one or more processors coupled to the memory, the one or more processors configured to cause the first UE to:
receive a communication from a second UE; and
transmit, to the second UE, sidelink hybrid automatic repeat request acknowledgement (HARQ-ACK) feedback using a sidelink component carrier based at least in part on the communication received from the second UE, wherein the sidelink component carrier is associated with conveying the sidelink HARQ-ACK feedback when sidelink carrier aggregation is configured for a group of UEs that includes the first UE and the second UE, wherein the sidelink component carrier is selected based at least in part on a rate matching pattern applied (i) for each sidelink component carrier or for each sidelink resource pool across a plurality of sidelink component carriers, or (ii) per band across a plurality of intra-band sidelink component carriers.

11. A first user equipment (UE) for wireless communication, comprising:
a memory; and
one or more processors coupled to the memory, the one or more processors configured to cause the first UE to:
transmit data to a second UE; and
receive, from the second UE, sidelink hybrid automatic repeat request acknowledgement (HARQ-ACK) feedback via a sidelink component carrier after transmission of the data to the second UE, wherein the sidelink component carrier is associated with conveying the sidelink HARQ-ACK feedback when sidelink carrier aggregation is configured for a group of UEs that includes the first UE and the second UE, wherein the sidelink component carrier is selected based at least in part on a rate matching pattern applied (i) for each sidelink component carrier or for each sidelink resource pool across a plurality of sidelink component carriers, or (ii) per band across a plurality of intra-band sidelink component carriers.

12. The first UE of claim 10, wherein a group of sidelink component carriers that includes the sidelink component carrier are preconfigured for the group of UEs, wherein the group of sidelink component carriers are associated with a same sidelink feedback channel configuration, a different sidelink feedback channel configuration, or no sidelink feedback channel configuration.

13. The first UE of claim 10, wherein the sidelink component carrier is included in a subset of sidelink component carriers, wherein the subset is a portion of a plurality of sidelink component carriers.

14. The first UE of claim 10, wherein the one or more processors are further configured to cause the first UE to:
receive an indication of the sidelink component carrier associated with conveying the sidelink HARQ-ACK feedback, wherein the sidelink component carrier is associated with a sidelink feedback channel configuration, wherein:
the indication is received from a base station via a relay node; or
the indication is received from the second UE via a sidelink connection between the first UE and the second UE; or
the sidelink component carrier associated with the indication is selected from a group of sidelink component carriers that are configured to potentially carry the sidelink HARQ-ACK feedback.

15. The first UE of claim 10, wherein the sidelink component carrier used to convey the sidelink HARQ-ACK feedback is specific to a sidelink connection between the first UE and the second UE, or the sidelink component carrier used to convey the sidelink HARQ-ACK feedback is associated with a sidelink feedback channel configuration, or the sidelink component carrier used to convey the sidelink HARQ-ACK feedback is common among the group of UEs, or the sidelink component carrier used to convey the sidelink HARQ-ACK feedback is different among the group of UEs.

16. The first UE of claim 10, wherein the sidelink component carrier corresponds to an initial sidelink component carrier used for discovery and link setup between the first UE and the second UE.

17. The first UE of claim 10, wherein the sidelink component carrier is associated with a smallest index in relation to other sidelink component carriers in a group of sidelink component carriers.

18. The first UE of claim 10, wherein the sidelink carrier aggregation is allowed across sidelink component carriers associated with a same sidelink feedback channel configuration, or the sidelink carrier aggregation is included in a set of intra-band sidelink component carriers associated with a same sidelink feedback channel configuration.

19. The method of claim 9, wherein a group of sidelink component carriers that includes the sidelink component carrier are preconfigured for the group of UEs, wherein the group of sidelink component carriers are associated with a same sidelink feedback channel configuration, a different sidelink feedback channel configuration, or no sidelink feedback channel configuration.

20. The method of claim 9, wherein the sidelink component carrier is included in a subset of sidelink component carriers, wherein the subset is a portion of a plurality of sidelink component carriers.

21. The method of claim 9, wherein the sidelink component carrier used to convey the sidelink HARQ-ACK feedback is specific to a sidelink connection between the first UE and the second UE, or the sidelink component carrier used to convey the sidelink HARQ-ACK feedback is associated with a sidelink feedback channel configuration, or the sidelink component carrier used to convey the sidelink HARQ-ACK feedback is common among the group of UEs, or the sidelink component carrier used to convey the sidelink HARQ-ACK feedback is different among the group of UEs.

22. The method of claim 9, wherein the sidelink component carrier corresponds to an initial sidelink component carrier used for discovery and link setup between the first UE and the second UE.

23. The method of claim 9, wherein the sidelink component carrier is associated with a smallest index in relation to other sidelink component carriers in a group of sidelink component carriers.

24. The method of claim 9, wherein the sidelink carrier aggregation is allowed across sidelink component carriers associated with a same sidelink feedback channel configuration, or the sidelink carrier aggregation is included in a set of intra-band sidelink component carriers associated with a same sidelink feedback channel configuration.

25. The first UE of claim 11, wherein a group of sidelink component carriers that includes the sidelink component carrier are preconfigured for the group of UEs, wherein the group of sidelink component carriers are associated with a same sidelink feedback channel configuration, a different sidelink feedback channel configuration, or no sidelink feedback channel configuration.

26. The first UE of claim 11, wherein the sidelink component carrier is included in a subset of sidelink component carriers, wherein the subset is a portion of a plurality of sidelink component carriers.

27. The first UE of claim 11, wherein the sidelink component carrier used to convey the sidelink HARQ-ACK feedback is specific to a sidelink connection between the first UE and the second UE, or the sidelink component carrier used to convey the sidelink HARQ-ACK feedback is associated with a sidelink feedback channel configuration, or the sidelink component carrier used to convey the sidelink HARQ-ACK feedback is common among the group of UEs, or the sidelink component carrier used to convey the sidelink HARQ-ACK feedback is different among the group of UEs.

28. The first UE of claim 11, wherein the sidelink component carrier corresponds to an initial sidelink component carrier used for discovery and link setup between the first UE and the second UE.

29. The first UE of claim 11, wherein the sidelink component carrier is associated with a smallest index in relation to other sidelink component carriers in a group of sidelink component carriers.

30. The first UE of claim 11, wherein the sidelink carrier aggregation is allowed across sidelink component carriers associated with a same sidelink feedback channel configuration, or the sidelink carrier aggregation is included in a set of intra-band sidelink component carriers associated with a same sidelink feedback channel configuration.

* * * * *